Dec. 17, 1929.   L. JETER   1,740,019
SAW TOOTH FILING DEVICE
Filed May 24, 1928   2 Sheets-Sheet 1

Inventor
Luther Jeter

Dec. 17, 1929.  L. JETER  1,740,019
SAW TOOTH FILING DEVICE
Filed May 24, 1928  2 Sheets-Sheet 2
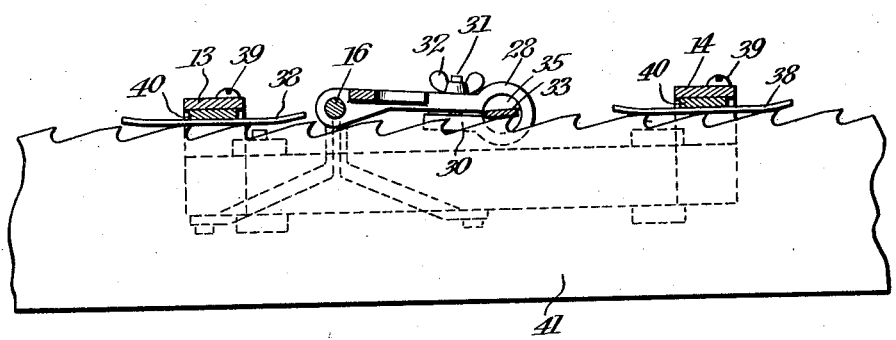
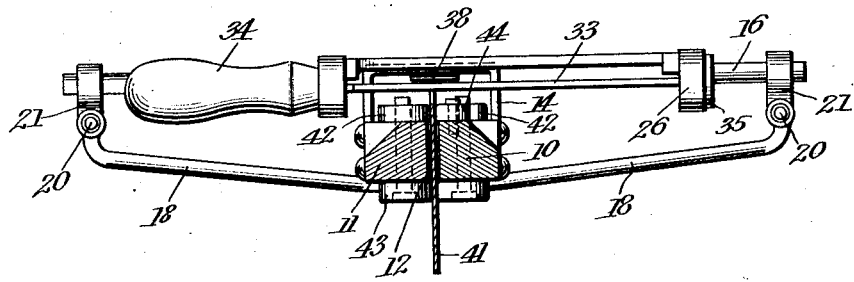
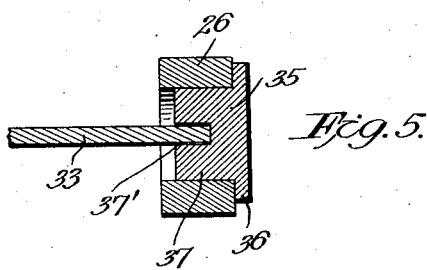
Inventor
Luther Jeter Patented Dec. 17, 1929

1,740,019

UNITED STATES PATENT OFFICE

LUTHER JETER, OF LOUISVILLE, KENTUCKY

SAW-TOOTH-FILING DEVICE

Application filed May 24, 1928. Serial No. 280,337.

The present invention relates to a filing apparatus and more especially to improvements in the construction and operation of a filing device for sharpening swage tooth saws and the like.

One of the essential objects of the invention is to provide a simple and efficient saw filing device for swage tooth saws, in which the proper sharpening of the saw teeth is not dependent upon any particular skill or experience of the operator and which the machine of itself when operated by either an experienced or inexperienced person will insure the proper filing of the saw teeth.

Heretofore, in saw filing devices, the efficiency of the machine has been dependent upon the skill or accuracy of the human eye, and as a result the operator is forced to very closely observe the teeth as they are being sharpened. It has been found that the bright part of the saw tooth being filed reflects into the eyes of the operator and has an injurious effect upon the sight.

One of the objects of the present development is to provide a saw filing machine which renders it unnecessary for the operator to closely watch the file during the sharpening operation, since the device is so constructed to efficiently file the saw teeth and does not need or require the close attention of the operator.

A further object comprehends the provision of a saw filing machine arranged to be directly supported by the saw and advanced from tooth to tooth by being moved bodily relative to the saw, thus insuring a uniform and accurate filing of each tooth.

Other objects and advantages of the invention will become apparent from the following description when taken in conjunction with the appended claims.

Referring to the drawings in which are illustrated a preferred embodiment of the invention:

Figure 3 is a sectional view taken substantially along the line 3—3 of Figure 1.

Figure 4 is a sectional view taken substantially along the line 4—4 of Figure 1.

Figure 5 is a sectional view taken substantially along the line 5—5 of Figure 1.

Figure 1:
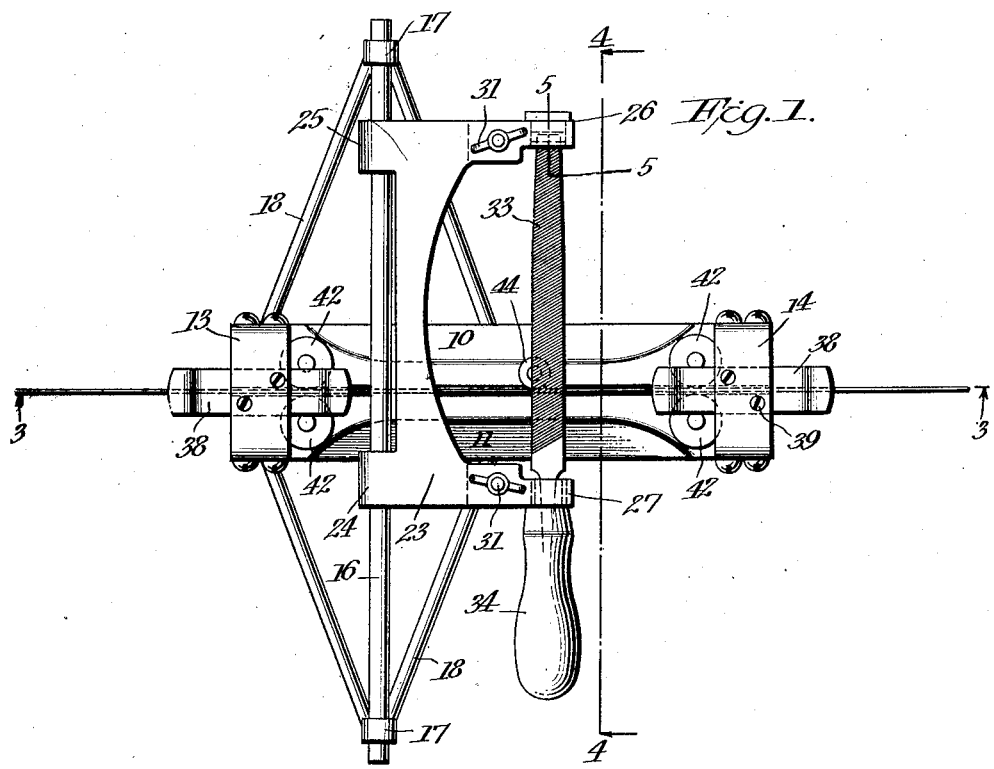
Figure 1 is a plan view of the saw filing device.

Referring to the drawings in which like numerals indicate like parts in the various views, the saw filing device essentially comprises a pair of elongated blocks 10 and 11, suitably spaced apart as at 12 (Figure 4) and preferably connected adjacent their ends by the substantially inverted U-shaped members 13 and 14 which are secured to the outer sides of each of the blocks 10 and 11 by the bolts 15.

Figure 2:
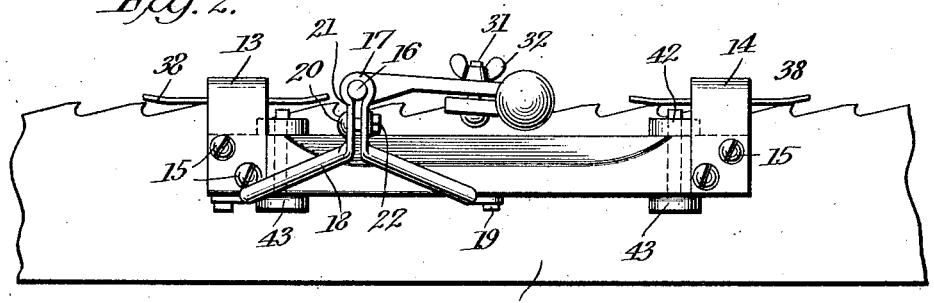
Figure 2 is a side elevation of Figure 1.

A guide rod 16 extends transversely across the blocks 10 and 11 and extends through eyelets 17 formed in the brace rods 18, which rods are secured by the bolts 19 to the underside of each of the blocks 10 and 11 respectively. The ends of the rod 16 are clamped in position by the threaded bolts 20 which extend through suitable openings formed in the vertical portions 21 of the brace rods 18 (Figure 2) and engage nuts 22 that are arranged to detachably secure the rod 16 in position.

A plate 23 is provided at one end with the spaced ears 24 and 25 through which loosely extends the guide rod 16 so as to permit the plate to be swivelly and slidably mounted on the guide rod 16. The opposite end of the plate 23 is provided with a pair of spaced yieldable clamping elements 26 and 27, each of which is formed with a hollow curved portion 28 (Figure 3) that terminates in a horizontally disposed portion 30 having an opening therein which registers with a complementary formed opening in the upper surface of the clamping element so as to receive a bolt 31 to which bolt is detachably secured a wing nut 32. A saw tooth file 33 having an operating handle 34 is arranged to be clamped in position by the elements 26 and 27 in the manner as shown in Figure 1. Preferably, the end of the file 33 is arranged to fit in a bushing 35 (Figure 5) that is provided with an annular flange portion 36 and a reduced portion 37 that extends into the element 26 so as to insure the proper positioning of the file when in operation. The reduced portion 37 of the bushing may also have a transverse slot 37', which detachably receives the adjacent end of the file 33.

The horizontal portions of each of the curved elements 13 and 14 has connected to the underside thereof a longitudinally extending supporting plate 38 (Figure 3) which is secured thereto by the bolts 39. A wear plate 40 may be interposed between the plate 39 and the adjacent side of the elements 13 and 14. Preferably, a swage tooth saw 41 is arranged to extend longitudinally through the opening 12 formed between the blocks 10 and 11 and normally assumes the position in which the supporting plates 38 rest against the teeth so that the filing device will be directly supported by the saw (Figure 3).

In order to maintain the saw in a proper fixed position relative to the filing device, the blocks 10 and 11 are provided adjacent their ends with pairs of upper and lower guide rolls 42 and 43 that are arranged to contact with the sides of the saw (Figure 4) to secure the latter in proper filing position and prevent any material variation in the teeth when being filed. By reason of the swivel connection of the plate 23 with the guide rod 16, the file 33 may be adjusted to either the front or back of the saw teeth, as may be desired.

The filing device is particularly adapted for use in sharpening swage tooth saws of various widths and is so arranged as to file perfectly square, in fact it will not sharpen in any other way irrespective of the experience of the operator. Moreover, the device is neither clamped or otherwise fastened to a stationary support, but is used as any other tool found in the filing room of log mills or the like. After the band saw has been ground, the filing tool or device is placed on the saw so as to be supported thereby and moved from tooth to tooth while the file will sharpen each tooth uniformly and evenly.

The present invention is particularly adapted for filing band tooth saws, and provides a cutting surface for both sides, thus distinguishing from briar tooth saw filing machines in which only one side of the tooth is cleared.

The operation of the device is as follows:
Assuming it is desired to sharpen a swage tooth band saw 41, the filing device is placed on the saw adjacent the teeth to be sharpened so that the supporting plates will engage the saw teeth in the manner as clearly shown in Figure 3. In this position the rollers 42 and 43 snugly engage the adjacent sides of the saw to positively maintain the parts in fixed operative position. The upper surface of either block 10 or 11 adjacent the path of the file may be additionally provided with a roller 44 (Figure 1) in the present instance shown secured to the top of the block 10, so as to assist in maintaining the saw in proper position during the filing operation. The filing device after sharpening one tooth is bodily moved so as to bring the file into alignment with the succeeding tooth and the filing operation is then repeated. The blocks 10 and 11 and their associated parts constitute a carriage which during the filling operation assumes a position below the top line of the saw so as to insure an accurate filing and prevent the parts from wabbling.

It will be observed that by reason of the clamping elements 26 and 27 the file may be readily removed from the device or maintained in any predetermined position as may be desired. Moreover, due to the fact that the filing device when once set up and moved to its operative position will, without requiring any skill on the part of the operator efficiently file the saw teeth, there is no necessity for the operator to strain his eyes watching the teeth being filed, since the device will of itself accurately insure a proper sharpening of the saw.

It is to be understood that the form of the invention herewith shown and described is merely illustrative of a preferred embodiment and that such changes as fall within the purview of one skilled in the art, may be made without departing from the spirit of the invention and the scope of the appended claims.

What I claim is:

1. In a saw filing device having longitudinally disposed spaced blocks arranged to receive a saw therebetween, members connecting said blocks, each of said members having a horizontal transverse portion above said blocks and depending end portions secured to the blocks, a stationary guide rod connected to said blocks and extending transversely thereof, a plate slidably connected to said rod, a file connected to said plate, means on the underside of the horizontal portions of said members and arranged to engage the top surface of the saw for supporting the filing device, revoluble means connected to the blocks and arranged to engage the sides of the saws for maintaining the latter firmly in position during the filing operation, and means mounted on one of the blocks adjacent the point of filing for additionally supporting the saw during the filling operation.

2. In a saw filing device for longitudinally disposed spaced blocks, members connecting said blocks, each of said members having a horizontal transverse portion positioned above said blocks and depending end portions secured to the blocks, a stationary guide rod connected to the blocks and extending transversely thereof, a plate slidably connected to said rod, a file detachably connected to said plate, yieldable means connected to the underside of the horizontal portions of said members and arranged to engage the top surface of the saw for supporting the filing device thereon, shafts extending vertically through said blocks, rollers journaled to the ends of said shaft and arranged to engage the sides of the saw for maintaining the latter in fixed position during the filing operation, and a revoluble member mounted on one of said blocks adjacent the point of filing of the saw for additionally supporting the latter in position.

In testimony whereof I have hereunto set my hand.

LUTHER JETER.